United States Patent
Kang

(10) Patent No.: US 8,355,260 B2
(45) Date of Patent: Jan. 15, 2013

(54) PORTABLE TERMINAL

(75) Inventor: Lai O Kang, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 192 days.

(21) Appl. No.: 12/837,972

(22) Filed: Jul. 16, 2010

(65) Prior Publication Data

US 2011/0013372 A1    Jan. 20, 2011

(30) Foreign Application Priority Data

Jul. 17, 2009    (KR) .................. 10-2009-0065401

(51) Int. Cl.
*H05K 5/00*    (2006.01)
(52) U.S. Cl. ...................................... 361/752
(58) Field of Classification Search .......... 361/52, 361/679.09, 679.01, 679.02, 686, 755
See application file for complete search history.

(56) References Cited

U.S. PATENT DOCUMENTS

| | | | |
|---|---|---|---|
| 6,552,909 B1* | 4/2003 | Liebenow | 361/725 |
| 7,483,262 B2* | 1/2009 | Yin et al. | 361/679.01 |
| 2002/0066832 A1* | 6/2002 | Kwon | 248/27.3 |
| 2002/0176235 A1* | 11/2002 | Kasahara et al. | 361/752 |
| 2002/0186530 A1* | 12/2002 | Nakajima et al. | 361/683 |
| 2003/0030996 A1* | 2/2003 | Shiina et al. | 361/752 |
| 2005/0174724 A1* | 8/2005 | Chen | 361/681 |
| 2006/0092036 A1* | 5/2006 | Yamaguchi | 340/815.4 |
| 2006/0281348 A1* | 12/2006 | Burris et al. | 439/108 |
| 2008/0013264 A1* | 1/2008 | Ido | 361/681 |
| 2008/0045057 A1* | 2/2008 | Mizunaga et al. | 439/137 |
| 2008/0170358 A1* | 7/2008 | Ikunami | 361/681 |
| 2008/0198537 A1* | 8/2008 | Kuo et al. | 361/679 |
| 2009/0279236 A1* | 11/2009 | Hatanaka | 361/679.01 |
| 2009/0323264 A1* | 12/2009 | Eldershaw | 361/679.01 |

* cited by examiner

*Primary Examiner* — Lisa Lea Edmonds
*Assistant Examiner* — Xanthia C Cunningham
(74) *Attorney, Agent, or Firm* — Morgan, Lewis & Bockius LLP

(57) ABSTRACT

A portable terminal includes a main body unit having an opening at a side thereof, a port cover rotatably formed on the side of the main body unit to open or close the opening, and a port assembly formed within the main body unit configured to be projected out of the opening when the port cover opens the opening.

15 Claims, 19 Drawing Sheets

PORTABLE TERMINAL

Pursuant to 35 U.S.C. §119(a), this application claims the benefit of earlier filing date and right of priority to Korean Application No. 10-2009-0065401, filed on Jul. 17, 2009, the contents of which are hereby incorporated by reference herein in their entirety.

BACKGROUND OF THE INVENTION

1. Field of the Invention

The present invention relates to a portable terminal. Although the present invention is suitable for a wide scope of applications, it is particularly suitable for facilitating a user to carry and use a terminal in consideration of user's convenience.

2. Discussion of the Related Art

Generally, a terminal is a device configured to input/output and/or process data using electronic circuitry. A portable terminal includes a mobile phone configured to transceive and process digital or analog data as well as a mobile computer configured to perform computation with expression or logical language.

The portable terminal includes a portable digital device, which facilitates a user to utilize and enjoy various contents by playing back various multimedia files including video, music, image and the like, as a PDA (personal digital assistant), and a ultra mobile PC, a PMP (portable multimedia player) and the like.

This portable terminal tends to pursue a slim, light & downsized shape to provide a user with convenient portability. Hence, a user is able to carry and use the portable terminal while moving. Many ongoing efforts are made to optimize space for loading parts for operating a device.

This portable terminal includes an interface unit playing a role as a passage for exchanging data with an external device connected thereto. This interface unit is implemented into a port such as a socket, a plug and the like.

This port is configured to have a tetragonal shape with a predetermined height to enable a smooth connection to an external device in general. This port is fixed to an edge of a lateral side of a portable terminal body. A recent portable terminal strongly tends to minimize a thickness of the lateral side of the body to form a smooth and slim exterior.

However, since the above-configured port occupies a predetermined thickness and volume on the lateral edge of the portable terminal, limitation is put on downsizing the thickness of the lateral side or edge of the portable terminal Therefore, it is difficult to design a user-preferred portable terminal.

For instance, it is difficult to design a rounded or sloped edge portion of a portable terminal to provide a smooth and elegant exterior of the mobile terminal because a port is fixed at a predetermined height to a lateral side of the mobile terminal.

SUMMARY OF THE INVENTION

Accordingly, the present invention is directed to a portable terminal that substantially obviates one or more problems due to limitations and disadvantages of the related art.

An object of the present invention is to provide a portable terminal having a port for a connection to an external device that does not occupy an edge space of a lateral side of a main body.

Another object of the present invention is to provide a portable terminal, by which an internally hidden port can be externally exposed in case of use only.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a portable terminal according to the present invention includes a main body unit having a main board and an opening provided to a lateral side of the main body unit to communicate externally, a port cover rotatably provided to the lateral side of the main body unit to selectively open/close the opening, and a port assembly provided within the main body unit to be projected out of the opening when the port cover opens the opening.

Preferably, the lateral side of the main body unit is configured to be sloped and wherein the port cover is configured to form a partial exterior of the lateral side of the main body unit.

Preferably, the port assembly is configured to slide in a horizontal direction of the main body unit by being interconnected to an open/close action of the port cover.

More preferably, the port assembly includes a port unit having a port part connected to an external device, the port assembly configured to slide to enable the port part to be selectively projected out of the opening, and a driving unit provided to the port unit to selectively provide a driving force for sliding of the port unit.

In this case, the driving unit is configured by a push-latch system for providing an elastic force to the port unit selectively if a push action in one direction is alternately performed.

And, if the port cover is pressurized, the driving unit 80 performs a push action for providing the driving force to the port unit by the port unit moving toward an inside of the main body unit.

More preferably, a driving projection and a guide slit for mutually guiding a sliding of the port unit and a rotary motion of the port cover are provided to the port unit and the port cover, respectively, to oppose each other.

In this case, a hinge part is provided to both sides of the port cover to be hinged on the main body unit and the guide slit is configured in a circular arc shape to convert a horizontal motion of the driving projection to the rotary motion of the port cover.

The port unit includes a sub-board having an electric circuit organized thereon, the sub-board having the port part mounted thereon, the sub-board electrically connected to the main board via a flexible cable, and a slider having the sub-board mounted thereon, the slider provided with the driving projection to slide in a horizontal direction.

In this case, the portable terminal further includes a spring inserted between the port cover and the main body unit to provide an elastic force to enable the port cover to rotate in a direction for engaging the opening.

And, the portable terminal further includes a slide holder provided to both sides of the port unit to guide a horizontal movement of the port unit and support the port unit.

More preferably, a rack gear having a plurality of saw teeth formed in a horizontal direction is provided to the port unit and a pinion gear configured to rotate by engaging with the rack gear is provided to the port cover.

In this case, the rack gear is provided to a bottom of the port unit and the pinion gear is provided to become a rotational shaft of a hinge part of the port cover.

Preferably, the port assembly includes a port part selectively projected from the opening to be connected to an external device, a slider slidably provided to a receiving part provided within the main body unit to have the port part fixed thereto, and a link member having one end portion linked to the slider rotatably, the link member having the other end portion linked to the port cover rotatably.

More preferably, the portable terminal further includes a guide part configured to guide a motion of the slider. And, the guide part includes a guide projection projected from a lateral side of the slider and a guide slot provided to a sidewall of the receiving part to enable the guide projection to be movably inserted therein.

In this case, the guide slot is configured to have a straight line shape to guide a straight line motion of the slider.

The guide slot includes a straight line portion configured to guide the straight line motion of the slider and a curved portion bent at an end portion of the straight line portion to implement a tilting section for tilting the slider at a predetermined angle.

In another aspect of the present invention, a portable terminal includes a main body unit configured to have a sloped lateral side, a port cover configured to form a partial exterior of the lateral side of the main body unit by being hinged on the main body unit to selectively open the lateral side of the main body unit, and a port assembly provided to be hidden within the main body unit, the port assembly configured to be projected out of the lateral side of the main body unit by sliding in a horizontal direction if the port cover is turned to open the lateral side of the main body unit.

Preferably, as a push operation for pushing the port cover is alternately performed, the port assembly selectively slides toward the lateral side of the main body unit. The port cover is turned to open the lateral side of the main body unit by being interconnected to the sliding of the port assembly.

More preferably, if the port cover is rotated to cover the port assembly, the port assembly slides toward an inside of the main body unit by being interconnected to the rotation of the port cover.

In this case, the port assembly is configured by a push-latch system. By the push-latch system, as a push action is alternately performed in one direction, an elastic force is selectively applied to enable the port assembly to slide toward the lateral side of the main body unit.

A driving projection and a guide slit for mutually guiding a sliding of the port assembly and a rotary motion of the port cover are provided to the port assembly and the port cover, respectively, to oppose each other.

Moreover, mutual motions of the port assembly and the port cover are restricted by the driving projection and the guide slit, respectively. And, a spring is inserted between the port cover and the main body unit to provide an elastic force to enable the port cover to rotate in a direction for opening the opening.

More preferably, a rack gear having a plurality of saw teeth formed on a horizontal direction is provided to the port assembly and a pinion gear configured to rotate by engaging with the rack gear is provided to the port cover.

According to the present invention, as a port for a connection to an external device is provided within a main body not to occupy an edge space of a lateral side of the main body but to move to a lateral side edge of the main body in a horizontal direction in case of use only, the lateral side of the main body can be freely designed. Therefore, the present invention enhances a degree of design freedom.

According to the present invention, as a port is hidden in a main body to be externally projected in case of use only, a complicated configuration is not externally exposed. Therefore, the present invention enables a beautiful design of an exterior. Moreover, as the port is protected against external particles to keep away from damage, the present invention enhances durability of the port.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, a portable terminal described in the following specification includes a mobile phone, a smart phone, a mobile computer, a digital broadcast terminal, a PDA (personal digital assistants), a PMP (portable multimedia player), a navigation system or the like.

Figure 1:
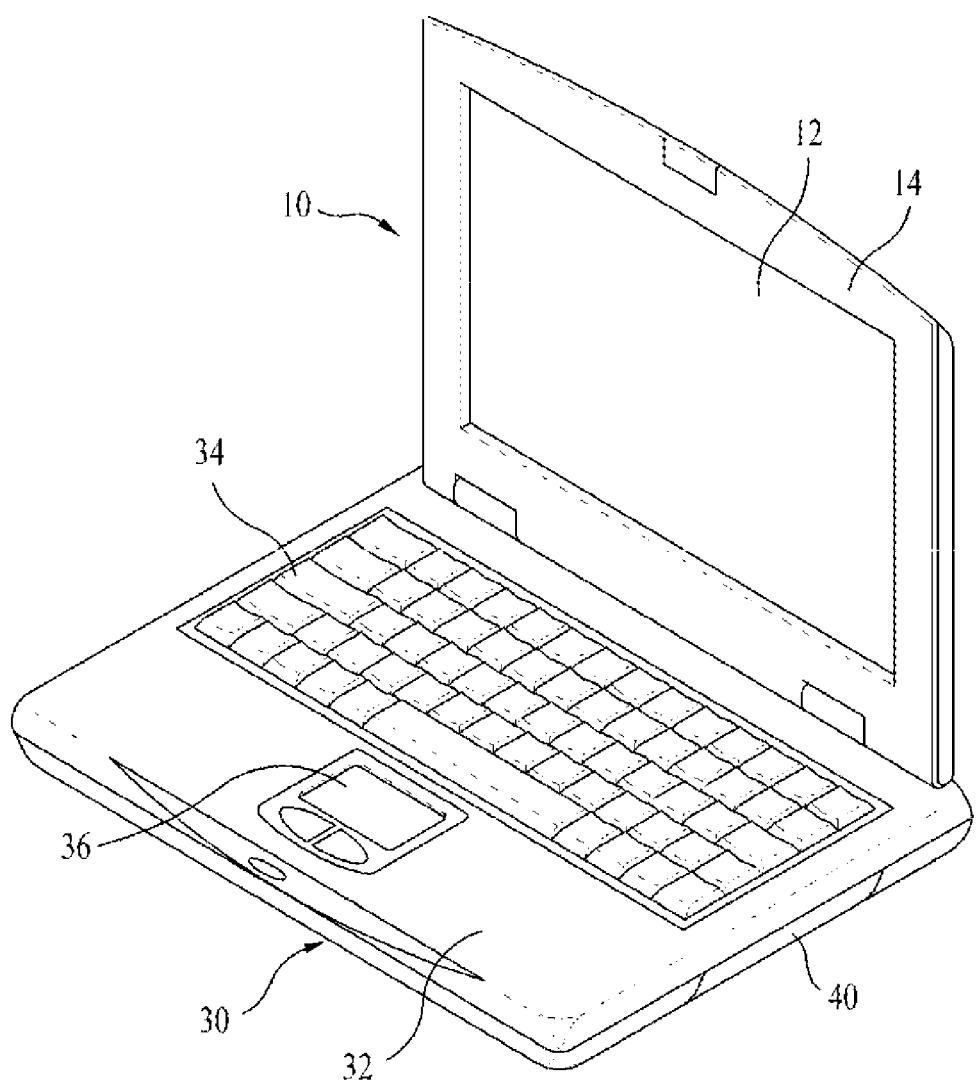
FIG. 1 is a perspective diagram of a portable terminal according to a preferred embodiment of the present invention.

FIG. 1 is a perspective diagram of a portable terminal according to a preferred embodiment of the present invention.

Referring to FIG. 1, a main body of a portable terminal includes a display unit 10 configured to display an image and a main body unit 30 configured to rotatably support the display unit 10.

The display unit 10 displays an image for a program execution process via the main body unit 30 and the like. In this case, the display unit 10 is rotatably provided to the main body unit 30.

The display unit 10 includes a display panel 12 outputting an image thereon and a panel housing 14 configured to support the display panel 12 to protect.

The display panel 12 means a device for configuring an image overall in a manner that a light-emitting state of each pixel is differently implemented by a driving circuit arranged in a matrix form. The display panel 12 outputs data processed by the main body unit 30 and the like to a screen.

The display panel 12 can include such a module, which is operative in a manner that pixels are arranged in a matrix form, as a liquid crystal display (LCD), a plasma display panel (PDP), an organic light-emitting diode (OLED), a field emission display (FED), an electroluminescence (EL) display and the like.

The panel housing 14 is configured to protect parts loaded therein in a manner of isolating an inner space and an outer space from each other while accommodating the display panel 12 therein. According to a design condition, the panel housing 14 can include a plurality of separated bodies assembled together.

The main body unit 30 has an approximately flat hexahedral plate shape. An exterior and framework of the main body unit 30 are provided by a main body housing 32. A keyboard 34 and touchpad 36 for user inputs are provided to the main body housing 32.

According to the present embodiment, lateral sides of the main body unit 30 can be rounded or sloped against its bottom plane to provide smoothness in aspect of design.

A main board (not shown in the drawing) for mounting basic circuitry and parts thereon, various memories (ROM and RAM), a memory device (e.g., a hard disk drive, etc.) for storing data, an interrupt controller, a power supply unit (not shown in the drawing) providing power necessary for driving devices, and the like may be provided within the main body unit 30.

Figure 2:
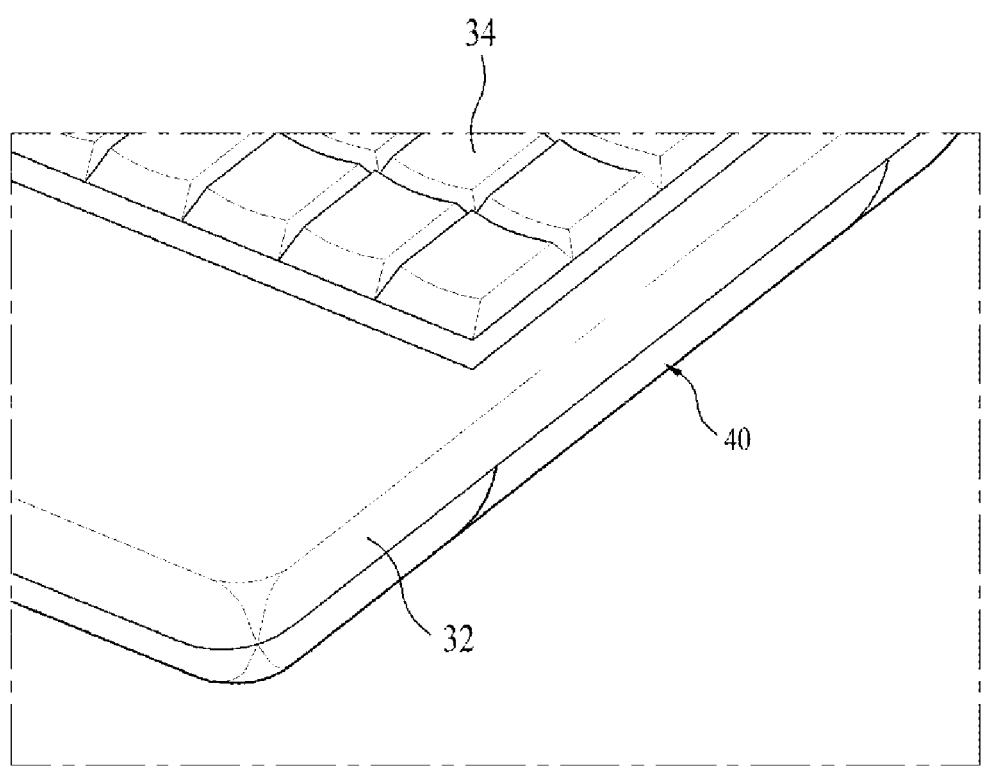
FIG. 2 is a partial perspective diagram of an embodiment of the present invention wherein a port cover is closed.
Figure 3:
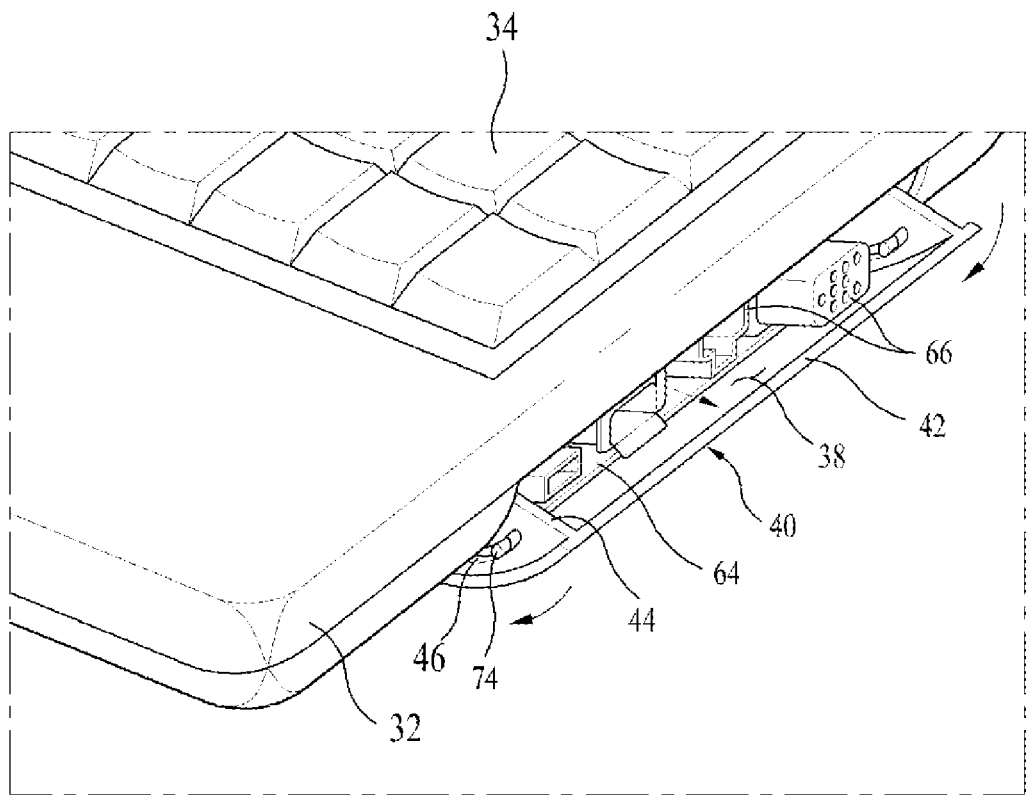
FIG. 3 is a partial perspective diagram of an embodiment of the present invention wherein a port cover is open.

FIG. 2 is a partial perspective diagram of an embodiment of the present invention wherein a port cover is closed. FIG. 3 is a partial perspective diagram of an embodiment of the present invention wherein a port cover is open.

Referring to FIG. 2 and FIG. 3, an opening 38 is provided to a lateral side of the main body unit 30 to communicate with an external environment. The opening 38 provides a space in which an interface unit connected to an external device to transceive data mutually is loaded. This interface unit is implemented into such a port as a socket, a plug and the like.

The main body unit 30 is provided with a port cover 40 configured to selectively open/close the opening 38 and a port assembly (cf. a reference number '60'shown in FIG. 6) provided within the main body unit 30 to configure the interface unit and slide toward the opening 38 selectively.

The port cover 40 is rotatably provided to the lateral side of the main body unit 30. The port cover 40 forms a portion of an exterior of the lateral side of the main body unit 30. In particular, the lateral side of the main body unit 30 is configured to be sloped. And, the port cover 40 is configured to form a surface continuous with a surface of the main body unit 30 without being stepped with the sloping lateral side of the main body unit 30. Moreover, the port cover 40 plays a role in protecting the port assembly 60 externally.

Figure 4:
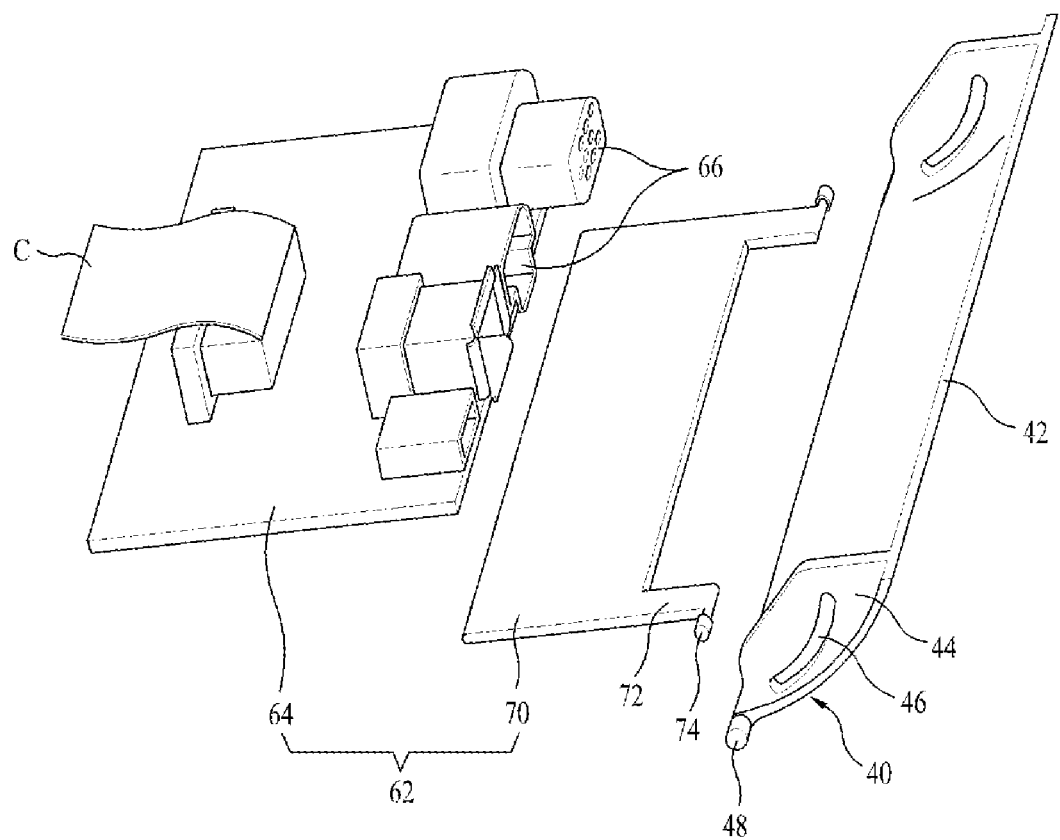
FIG. 4 is an exploded perspective diagram of a port assembly and a port cover of an embodiment of the present invention.
Figure 5:
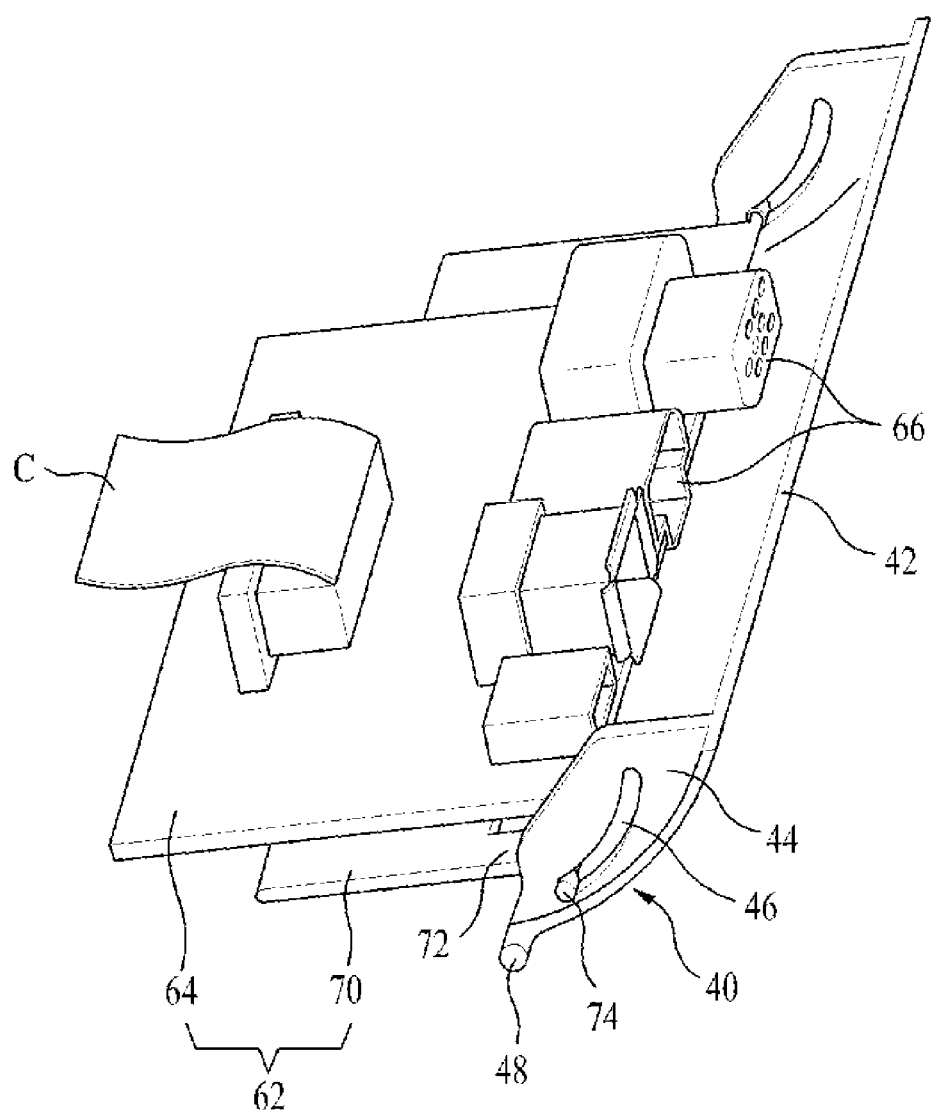
FIG. 5 is a perspective diagram of a port assembly and a port cover assembled together of an embodiment of the present invention.

FIG. 4 is an exploded perspective diagram of a port assembly and a port cover of an embodiment of the present invention. FIG. 5 is a perspective diagram of a port assembly and a port cover assembled together of an embodiment of the present invention.

Referring to FIG. 4 and FIG. 5, an exterior and framework of the port cover 40 are formed by a cover body 42. In particular, the cover body 42 is provided to correspond to the opening 38 and forms a lateral side exterior of the main body unit 30. According to the present embodiment, the cover body 42 is rounded to have a predetermined curvature.

A pair of brackets 44 are provided to the cover body 42. The pair of the brackets 44 are configured to be projected from both sides of a backside of the cover body 42, respectively. A guide slit 46 is provided to each of the brackets 44. The guide slit 46 is configured to be rounded along a rotatory trace of the cover body 42. The guide slit 46 is configured in a circular arc shape to convert a horizontal motion of a drive projection 74 provided to a port unit 62 to a rotary motion of the port cover 40.

A pair of hinge portions 48 are provided to both sides of the cover body 42, respectively. The cover body 42 is hinged on the main body unit 30 by the hinge portions 48. According to the present embodiment, the hinge portions 48 are provided to a bottom end of the cover body 42 to enable a top end of the cover body 42 to be selectively opened or closed.

The port assembly 60 is interconnected to the open/close action of the port cover 40 to slide in a horizontal direction of the main body unit 30. The port assembly 60 is provided within the main body unit 30. When the port cover 40 opens the opening 38, the port assembly 60 is projected out of the opening 38.

In particular, since the port assembly 60 has a predetermined thickness and volume, it is located not at the lateral side edge of the main body unit 30 but within the main body unit 30. When the port assembly 60 is used, the port assembly 60 moves to the lateral side of the main body unit 30 to facilitate a connection to an external device.

This is to enable the lateral side of the main body unit 30 to be rounded or slim. Therefore, it is advantageous in that a designer is able to design an exterior design without having to take into account the a space technically.

The port assembly 60 includes a port unit 62 configured to slide by constructing an interface unit, to which an external device is connected, and a driving unit (cf. '80' shown in FIG. 6) configured to selectively providing a driving force to enable the port unit 62 to slide.

The port unit 62 includes a sub-board 64 having electric circuit organized thereon, the sub-board 64 having a port part 66 mounted thereon, the sub-board 64 electrically connected to the main board via a flexible cable C, and a slider 70 having the sub-board 64 mounted thereon, the slider 70 provided with a driving projection 74 to slide in a horizontal direction.

The port part 66 is provided to be selectively projected out of the opening 38 as the slider 70 slides. The port part 66 can include various interfaces such as a LAN port, a modem port, an external mouse connecting port, a parallel port, a display connecting port, a wire/wireless headset port, an external charger port, a wire/wireless data port, a memory cart port, a port connecting a device having an identity module, an audio I/O (input/output) port, a video I/O (input/output) port, an earphone port, and the like.

The slider 70 includes a plate having an approximately rectangular shape. And, the sub-board 64 is installed at the slider 70. The sub-board 64 is fixed to the slider 70 and has the same motion of the slider 70. The slider 70 is configured to slide in a horizontal direction within the main body unit 30.

A connecting part 72 having the driving projection 74 is provided to the slider 70. In this case, the connecting part 72 is configured to be projected toward the cover body 42 from both end portions of the slider 70. And, the driving projection 74 is provided to an end portion of the connecting part 72 to move by being supported by the guide slit 46.

In particular, the driving projection 74 mutually guiding a sliding of the port unit 62 and a rotary motion of the port cover 40 and the guide slit 46 are provided to the port unit 62 and the port cover, respectively, to oppose each other.

Mutual motions of the port assembly 60 and the port cover 40 are restricted by the driving projection 74 and the guide slit 46, respectively. A spring S is inserted between the port cover 40 and the main body unit 30 to provide an elastic force to enable the port cover 40 to rotate in a direction for opening the opening 38.

Figure 6:
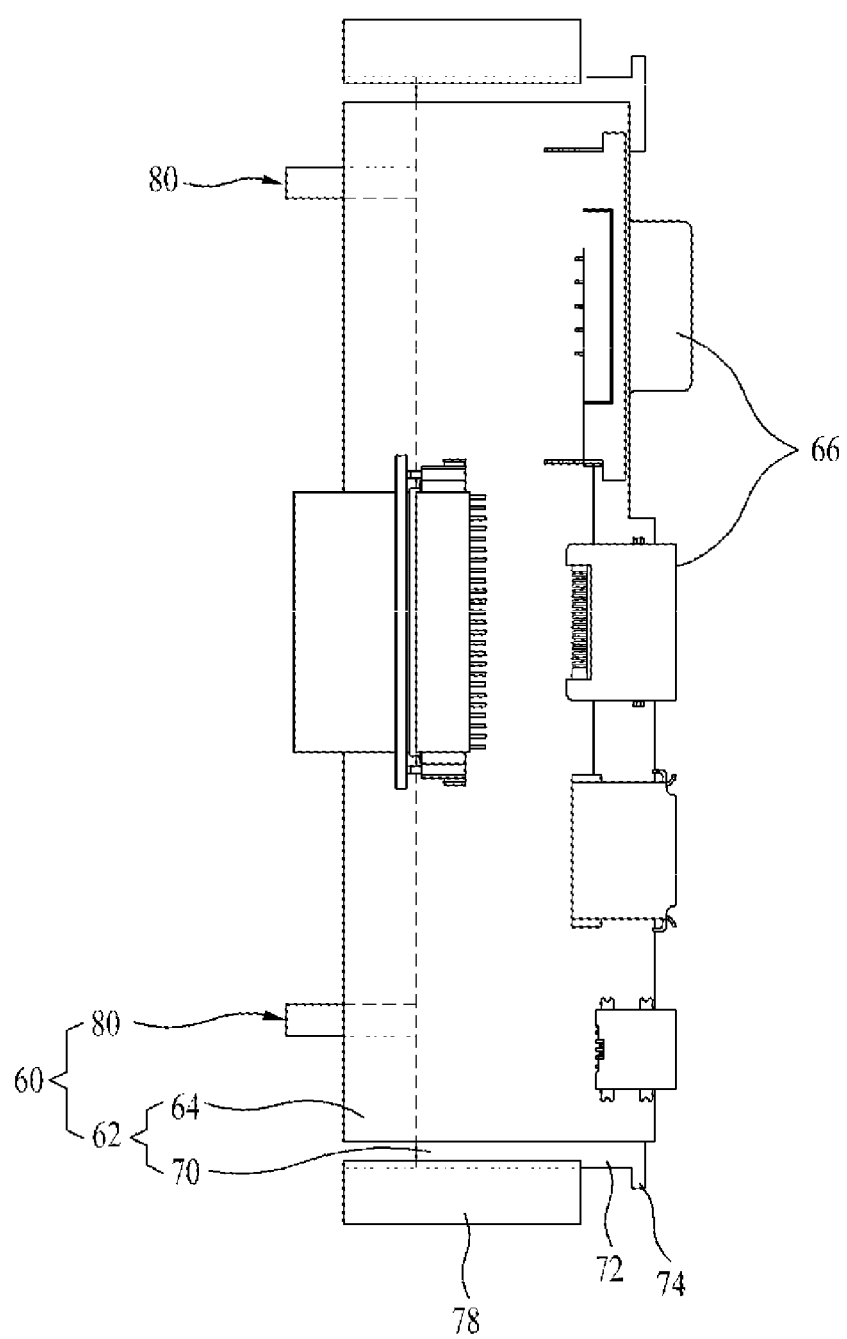
FIG. 6 is a layout of a port assembly of an embodiment of the present invention.

FIG. 6 is a layout of a port assembly of an embodiment of the present invention.

Referring to FIG. 6, a pair of slide holders 78 are provided to both sides of the port unit 62, respectively. The slide holder 78 plays a role in guiding a horizontal movement of the port unit 62 as well as supporting the port unit 62.

The driving unit 80 is provided to the slider 70. An elastic member such as a coil spring is provided within the driving unit 80 to selectively provide an elastic force by a cam structure for enabling a push-push action.

The driving unit 80 has a push-latch configuration for providing an elastic force to the port unit 62 selectively by alternately performing a one-directional push action.

The driving unit 80 has a configuration of repeating a latching action and an unlatching action by the push action and can be called a push-push spring, a push-push latch or the like. According to the present embodiment, the driving unit 80 is configured to provide an elastic force in a direction opposite to a push direction if unlatched.

As the port cover 40 is pressurized, the driving unit 80 performs a push action for providing a driving force to the port unit 62 by the port unit 62 moving toward an inside of the main body unit 30.

In particular, while the port cover 40 is shielding the port unit 62, if a user pushes the port cover 40, the port unit 62 retracts to push the driving unit 80. The driving unit 80 is then unlatched by this push action to provide the elastic force for enabling the port unit 62 to get closer to the port cover 40.

If the port cover 40 is pushed again to enable the port unit 62 to push the driving unit 80 by overcoming the elastic force, the driving unit 80 does not provide the elastic force to the port unit 62 by the latching action.

Therefore, according to the push-latch, if the port cover 40 is pushed in a closing direction, the port cover 40 maintains its closed state. If the port cover 40 is pushed again in the closing direction, the port cover 40 is opened. In particular, one push action closes the port cover 40. And, one push action opens the port cover 40.

Figure 7:
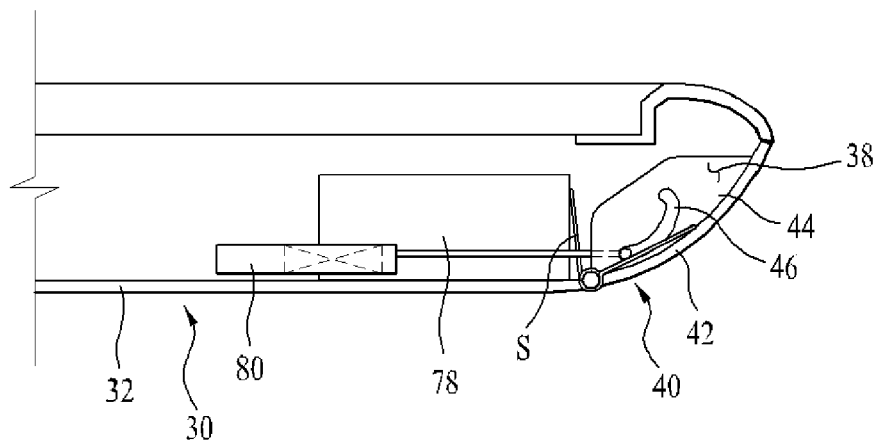
FIG. 7 is a cross-sectional diagram of a port cover of an embodiment of the present invention, in which the port cover is assembled to a main body unit.

FIG. 7 is a cross-sectional diagram of a port cover of an embodiment of the present invention, in which the port cover is assembled to a main body unit.

Referring to FIG. 7, a spring S is inserted between the port cover 40 and the main body unit 30. In particular, the spring S is provided between a slide holder 78 within the main body unit 30 and the port cover 40. The spring S provides an elastic force to rotate the port cover 40 in a direction for opening the opening 38. The spring S enables the opening action of the port cover 40 to be smoothly performed.

Operation of the above-configured portable terminal according to the present invention is explained in detail as follows.

FIGS. 8 to 11 are cross-sectional diagrams for illustrating a process for opening/closing a port cover according to one embodiment of the present invention.

Referring to FIGS. 8 to 11, the port cover 40 forms a lateral side exterior of the main body unit 30 and covers the port assembly externally. In this case, the driving unit 80 provided to the port assembly 60 is latched not to provide an elastic force to the port assembly 60.

Since the port cover 40 is restricted to the port unit 62 by the guide slit 46 and the driving projection 74, even if an elastic force of the spring S is applied, the port cover 40 is not turned.

Figure 8:
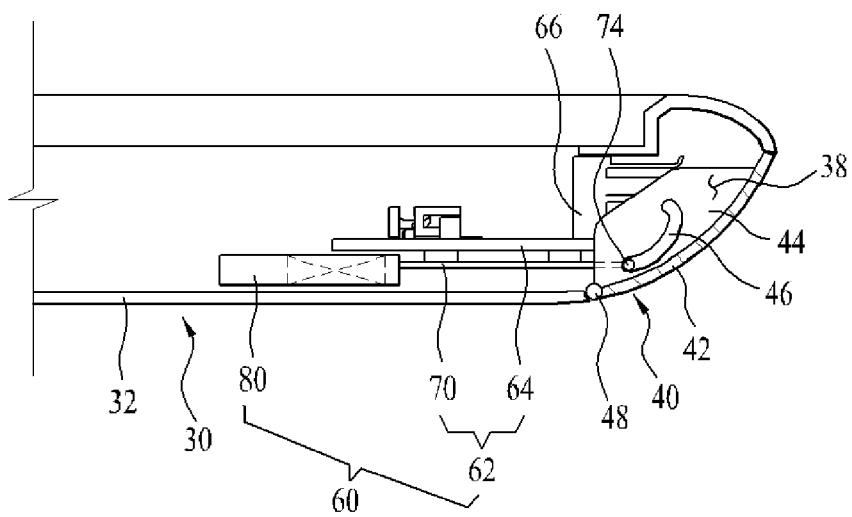
FIGS. 8 to 11 are cross-sectional diagrams for illustrating a process for opening/closing a port cover according to one embodiment of the present invention.

Referring to FIG. 8, the port assembly 60 is provided to be spaced apart from a lateral side of the main body unit 30 into an inside of the main body unit 30, whereby the lateral side of the main body unit 30 can be freely designed. Therefore, according to this embodiment, the lateral side of the main body unit 30 is smoothly rounded and sloped without roughness.

Figure 9:
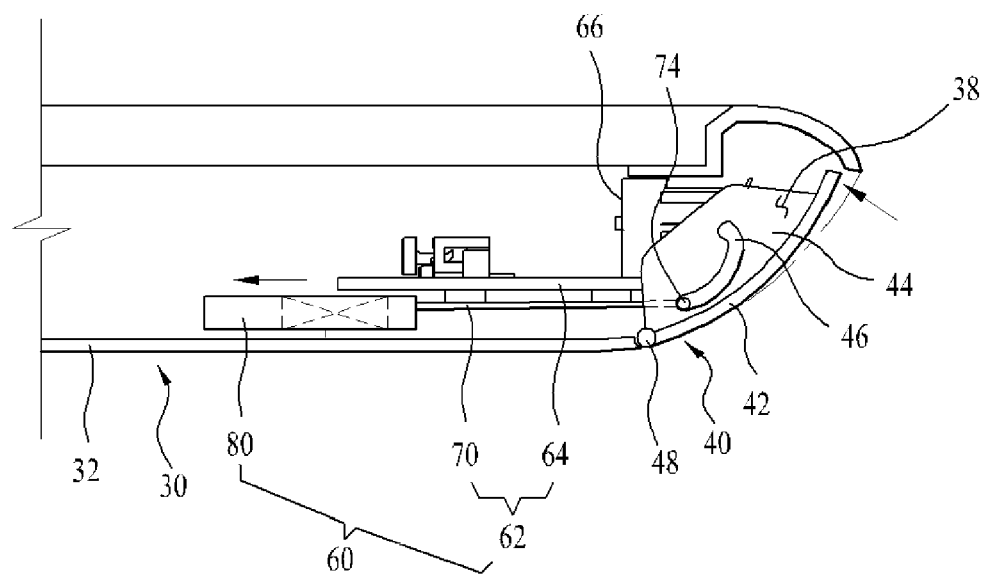

Referring to FIG. 9, while the port cover 40 is closed, if the port cover 40 is pushed inward, the port assembly 60 moves in a predetermined distance toward the driving unit 80 to push the driving unit 80. The driving unit 80 is then unlatched by this push action.

Figure 10:
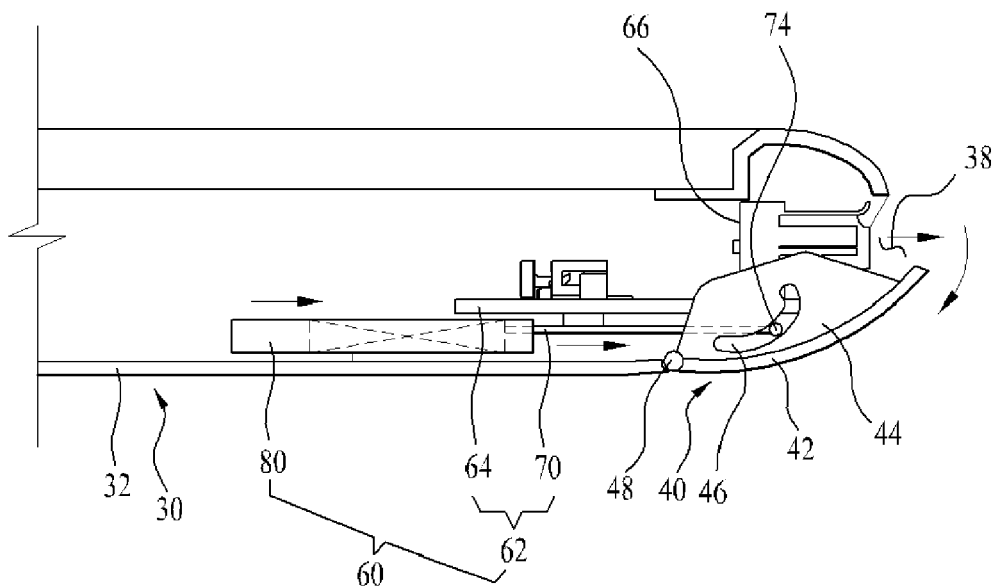

Referring to FIG. 10, as the driving unit 80 is unlatched to provide an elastic force to the port assembly 60, the port assembly 60 slides in a horizontal direction of the main body unit 30.

If the port assembly 60 slides toward the port cover 40, the driving projection 74 provided to the port assembly 60 pushes the port cover 40 via the guide slit 46. The port cover 40 then turns centering on the hinge part 48.

In this case, since the port cover 40 is provided with the elastic force in a direction of opening the opening 38 via the spring S, the rotation of the port cover 40 is smoothly performed.

Figure 11:
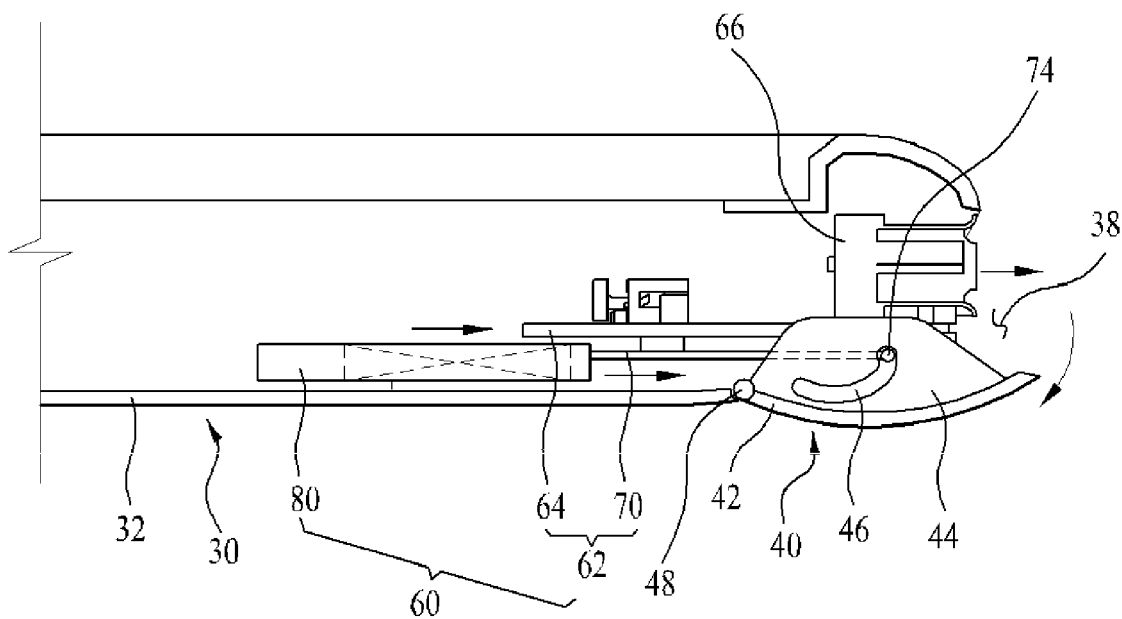

Referring to FIG. 11, if the port cover 40 is turned to open the opening 38 and the port assembly 60 slides in a horizontal direction to move to a lateral side edge of the main body unit 30, the port assembly 60 can be connected to an external device.

In this case, since a motion of the port assembly 60 is restricted by the port cover 40, although an external force is applied in a predetermined direction while the external device is connected to the port assembly 60, the port assembly 60 does not move into the main body unit 30.

Meanwhile, when the port assembly 60 is not used, a user closes the port cover 40. If the port cover 40 is turned in a direction opposite to that for opening the opening 38, the port assembly slides into the main body unit 30 by overcoming the elastic force of the driving unit 80 by the driving projection 74 and the guide slit 46.

If the port assembly 60 pushes the driving unit 80, a latching action of the driving unit 80 is performed not to provide the elastic force to the port assembly 60 but to be located within the main body unit 30. In doing so, the port cover 40 maintains its closed state by being restricted by the driving projection 74 of the port assembly 60.

A portable terminal according to another embodiment of the present invention is explained in detail with reference to the accompanying drawings as follows.

Figure 12:
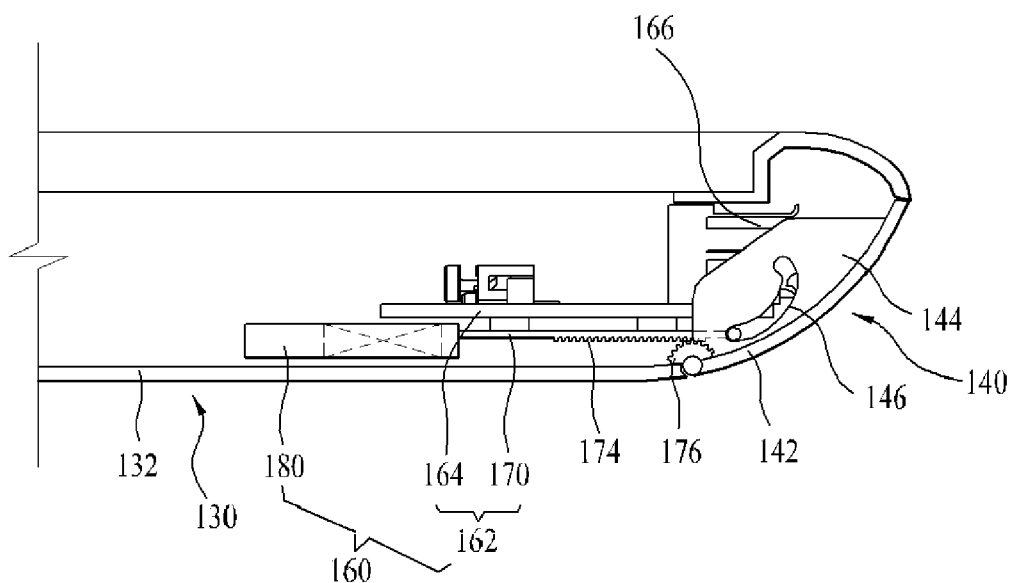
FIG. 12 and FIG. 13 are cross-sectional diagrams for illustrating a process for opening/closing a port cover according to another embodiment of the present invention.
Figure 13:
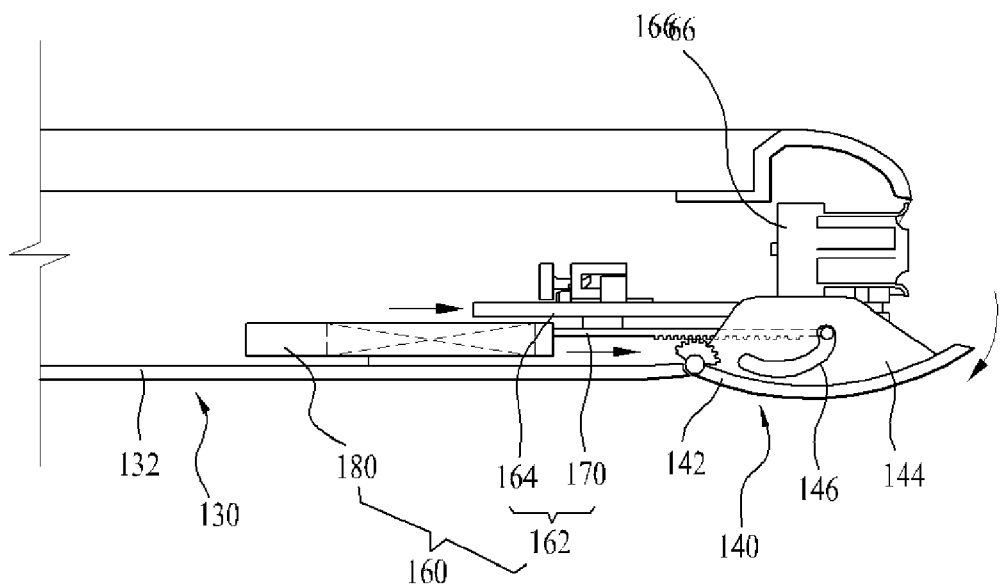

FIG. 12 and FIG. 13 are cross-sectional diagrams for illustrating a process for opening/closing a port cover according to another embodiment of the present invention.

Another embodiment of the present invention differs from the former embodiment with respect to a port unit and a port cover. The same parts shown in FIGS. 1 to 11 are not explained in the following description. Yet, the following description is made in a manner of simply giving a reference number by a unit of '100' to a part corresponding to the former part of the former embodiment explained in the foregoing description.

First of all, a main body unit 130 having a sloped lateral side includes a port cover 140 configured to form a partial exterior of the lateral side of the main body unit 130 by being hinged on the main body unit 130 to selectively open the lateral side of the main body unit 130 and a port assembly 160 provided to be hidden within the main body unit 130, the port assembly 160 configured to be projected out of the lateral side of the main body unit 130 by sliding in a horizontal direction if the port cover 140 is turned to open the lateral side of the main body unit 130.

The port assembly 160 is configured by push-latch. In particular, as a push action is alternately performed in one direction, an elastic force is selectively applied to enable the port assembly 160 to slide toward the lateral side of the main body unit 130.

As a push operation for pushing the port cover 140 is alternately performed, the port assembly 160 selectively slides toward the lateral side of the main body unit 130. And, the port cover 140 is turned to open the lateral side of the main body unit 130 by being interconnected to the sliding of the port assembly 160.

If the port cover 140 is rotated to cover the port assembly 160, the port assembly 160 slides toward an inside of the main body unit 130 by being interconnected to the rotation of the port cover 140.

The port assembly 160 includes a port unit 162 constructing an interface unit having an external device connected thereto, the port unit 162 configured to slide, and a driving unit 180 configured to provide a driving force selectively to enable the port unit 162 to slide.

According to the present embodiment, a rack gear 174 having a plurality of saw teeth formed in a horizontal direction is provided to the port unit 162, while a pinion gear 176 configured to rotate by engaging with the rack gear 174 is provided to the port cover 140.

In particular, the rack gear 174 is provided to a bottom of the slider 170, while the pinion gear 176 is provided to become a rotational shaft of a hinge part 148 of the port cover 140. In this case, the port cover 140 is opened/closed by being interconnected to the rotation of the pinion gear 176.

In particular, if the port assembly 160 slides toward the port cover 140, the rack gear 174 rotates the pinion gear 176. As the pinion gear 176 is rotated, the port cover 140 opens a direction in which the port assembly proceeds 160.

If the part cover 140 is turned in a closing direction, the rack gear 174 retracts to enable the port assembly 160 to slide into the main body unit 130.

Figure 14A:
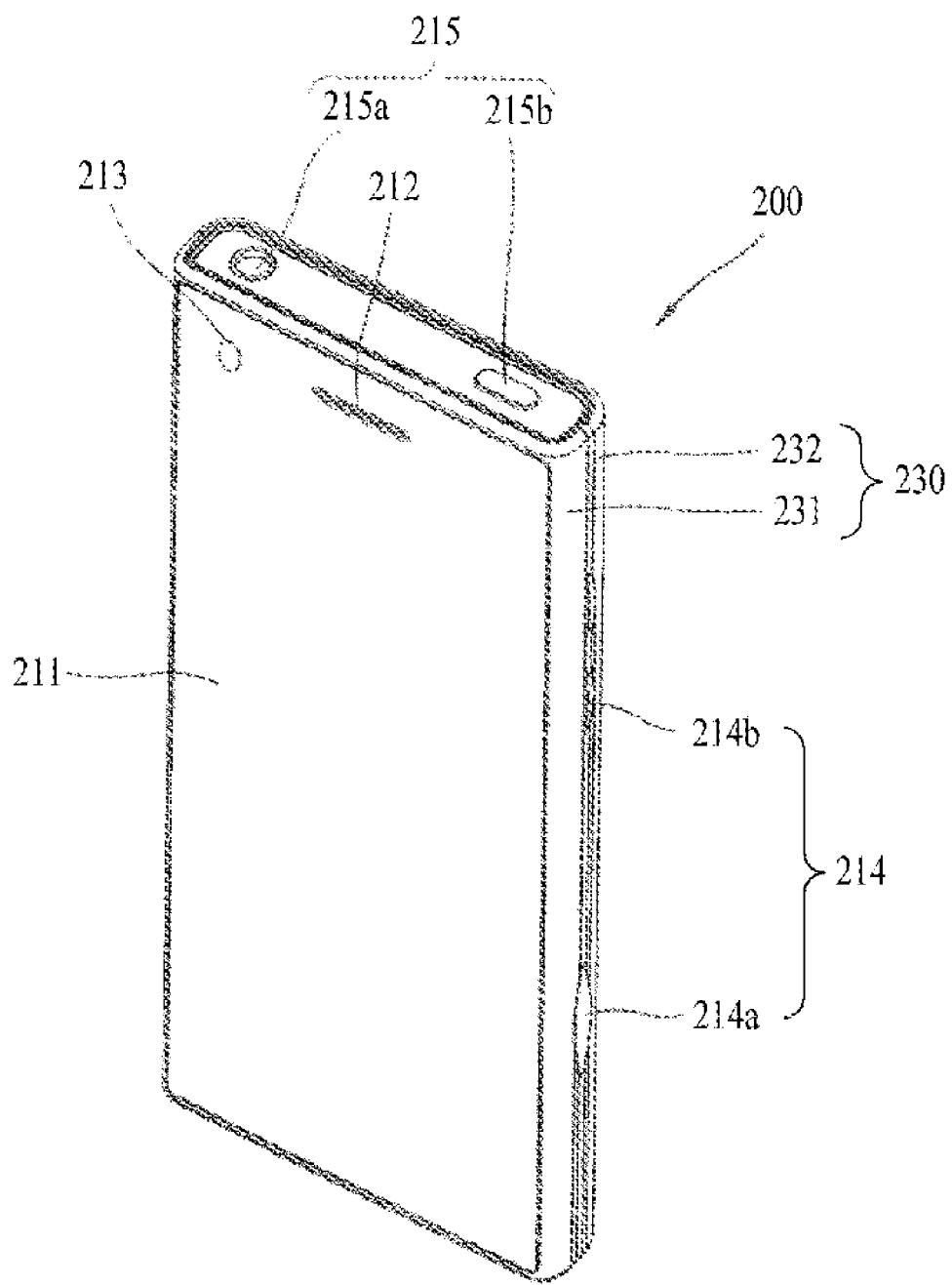
FIG. 14A is a front perspective diagram of a portable terminal according to a further preferred embodiment of the present invention.

FIG. 14A is a front perspective diagram of a portable terminal according to a further preferred embodiment of the present invention.

Referring to FIG. 14A, a portable terminal 200 includes a main body unit 230 of a bar type, by which the present invention is non-limited. And, the present invention is applicable to such a structure, which enabling at least two bodies to be connected to each other in a manner of moving relatively, as a slide type, a folder type, a swing type, a swivel type and the like.

The main body unit 230 includes a case (e.g., casing, housing, cover, etc.) forming an exterior. According to the present embodiment, the case can be divided into a front case 231 and a rear case 232. Various electric and electronic components are loaded in a space provided between the front case 231 and the rear case 232. Optionally, at least one middle case can be additionally provided between the front case 231 and the rear case 232.

The case is formed by injection molding of synthetic resin or can be formed of such a metal substance as stainless steel (STS), titanium (Ti) and the like.

A display unit 211, an audio output module 212, a camera 213, a user input unit 214 (214a, 214b) and the like can be provided to the main body unit 230, and more particularly, to the front case 231.

The display unit 211 mostly occupies a main surface of the front case 231. A speaker 212 and a camera 213 are provided to a region adjacent to one of both end portions of the display unit 211.

Various kinds of visual information can be displayed on the display unit 211. This information can be represented as touch-inputtable characters, numerals, symbols, graphics, icons and/or the like. At least one of the characters, numerals, symbols, graphics and icons are displayed in a manner of configuring a predetermined formation to implement a keypad figure. In this case, such a keypad can be called soft keys.

The user input unit 214 is manipulated to receive an input of a command for controlling an operation of the portable terminal 200. And, the user input unit 214 is able to include a plurality of manipulating units 214a and 214b. The manipulating units 214a and 214b can adopt any mechanism having a tactile manner that enables a user to perform manipulation with tactile feeling.

Contents inputted through the first or second manipulating unit 214a or 214b can be set in various ways. The first manipulating unit 214a receives such a command as start, end, scroll and the like, while the second manipulating unit 214b receives such a command as a volume adjustment of sound outputted from the speaker 212, a switching to a touch recognizing mode of the display unit 211, and the like.

Referring to the present drawing, a wire/wireless headset port 215a and a wire/wireless data port 215b can be provided to one lateral side of the portable terminal 200. In this case, the ports 215a and 215b are configured as one example for the interface 215.

Figure 14B:
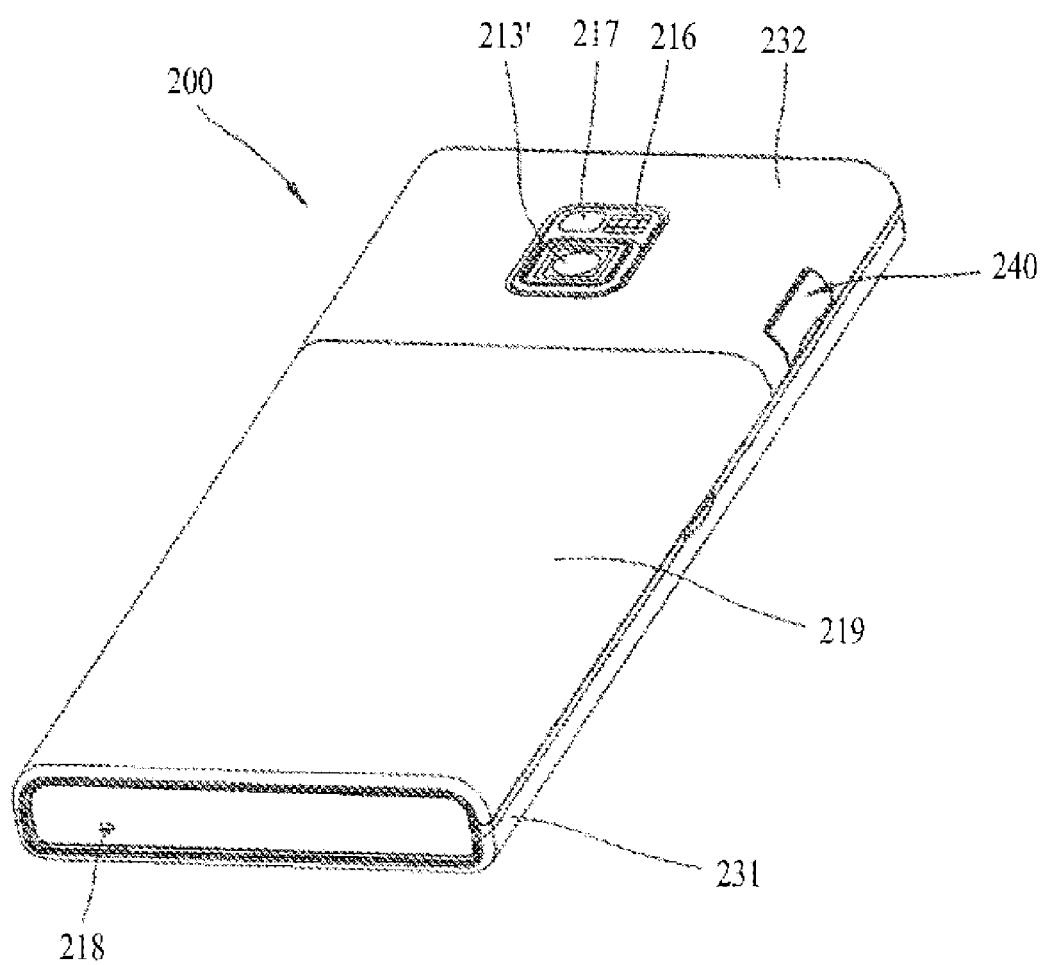
FIG. 14B is a rear perspective diagram of the portable terminal shown in FIG. 14A according to a preferred embodiment of the present invention.

FIG. 14B is a rear perspective diagram of the portable terminal shown in FIG. 14A according to a preferred embodiment of the present invention.

Referring to FIG. 14B, a camera 213' (hereinafter named a second camera) can be additionally provided to a backside of the main body unit 230, and more particularly, to the rear case 232. The second camera 213' has a photographing direction substantially opposite to that of the former camera 213 (hereinafter named a first camera) provided to the front side of the main body unit 230 and may include a camera having a pixel size different from that of the first camera 213.

For instance, the first camera 213 has low pixels enough to photograph and transmit a user face to a correspondent party in case of a video call or the like. The second camera 23' photographs a normal subject for photography and the photographed is not sent immediately right after the photographing in general. Therefore, the second camera 213' preferably has high pixels. Optionally, at least one of the cameras 213 and 213' can be installed at the main body unit 230 to be rotated or popped up.

A flash 216 and a mirror 217 are additionally provided adjacent to the second camera 231'. The flash 216 throws a light on a subject when the subject is photographed via the second camera 213'. When a user attempts to photograph himself/herself using the second camera 213' [self-photographing], the mirror 217 reflects the user's face thereon.

A receiving antenna can be additionally provided to a lateral side of the main body unit 230 as well as an antenna for a call or the like. The antenna configuring a part of a broadcast receiving module is retractably provided to the main body unit 230.

A microphone 218 for outputting sound, a port cover 240 for covering the port part (cf. '266 ' in FIG. 15 and FIG. 16) and the like can be provided to a lateral side of the main body unit 230.

A power supply unit for supplying a power to the portable terminal 200 can be provided to a backside of the main body unit 230. In particular, the power supply unit is built as a battery in the main body unit 230. Alternatively, the power supply unit can be detachably provided to the main body unit 230 in a manner of directly attached/detached externally. According to the present embodiment, a battery cover 219 is provided to the rear case 232 to cover the battery.

Figure 15:
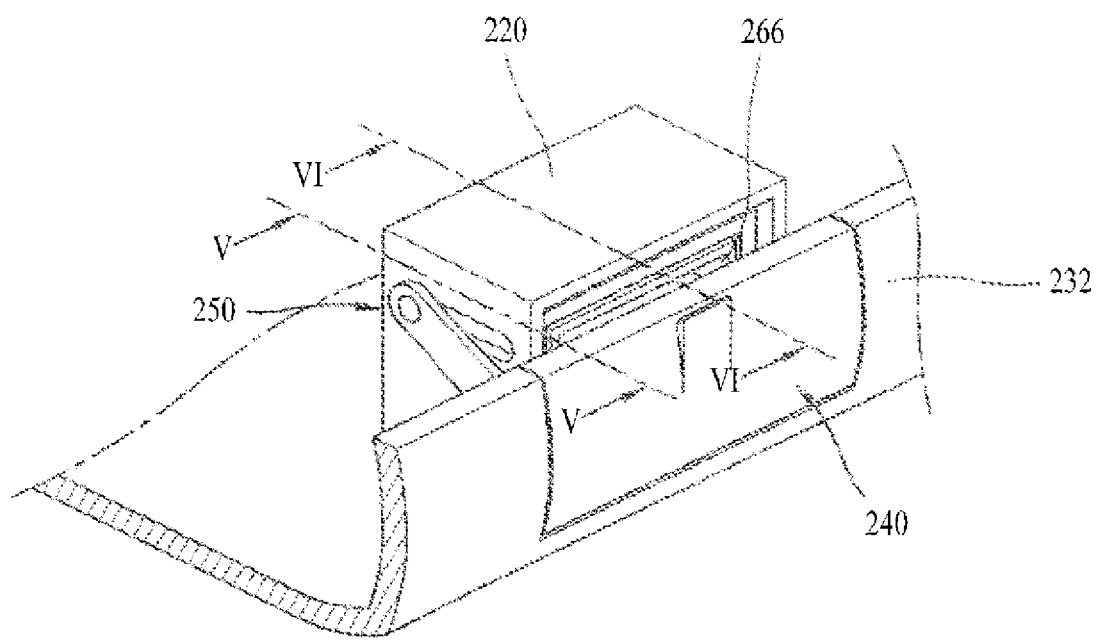
FIG. 15 is an exploded perspective diagram of one portion of the portable terminal shown in FIG. 14B.
Figure 16:
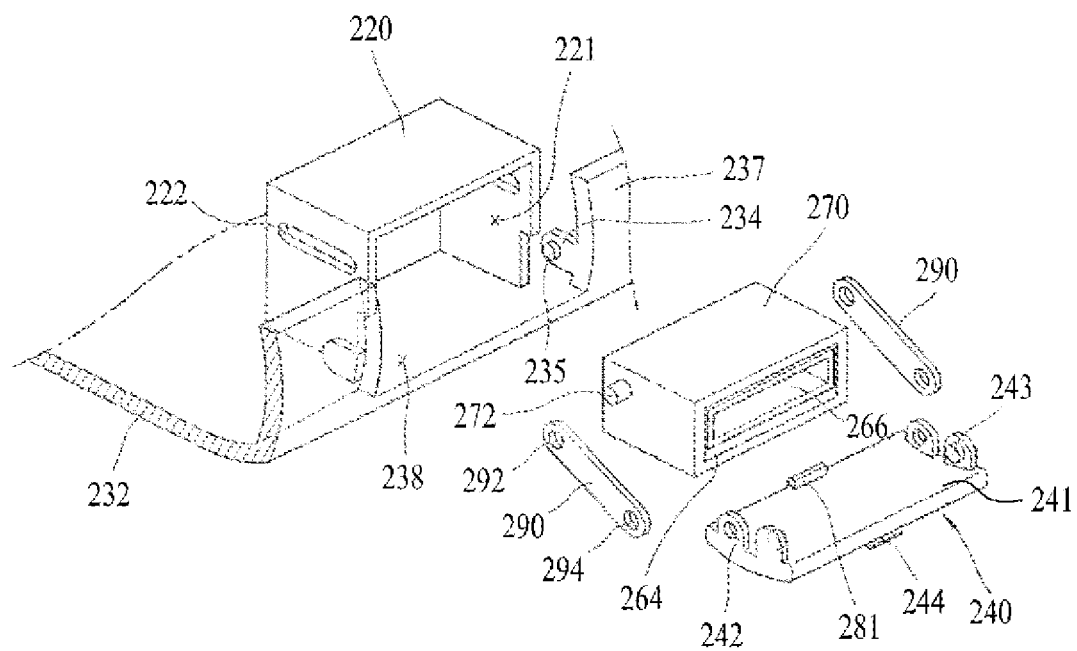
FIG. 16 is an exploded perspective diagram of configurations shown in FIG. 15.

FIG. 15 is an exploded perspective diagram of one portion of the portable terminal shown in FIG. 14B, and FIG. 16 is an exploded perspective diagram of configurations shown in FIG. 15.

Referring to FIG. 15 and FIG. 16, the main body unit 230 includes an opening 238. According to the present embodiment, the opening 238 is formed in the rear case 232. Alternatively, the opening 238 is formed in the front case 231 or can be provided to both of the front case 231 and the rear case 232.

A receiving part 220 is provided to a location spaced inward apart from the opening 238 in a predetermined distance. The receiving part 220 is provided with an inner space 221. According to the present embodiment, the receiving part 220 has a box shape of which one side is open. Referring to FIG. 15, the receiving part 220 is configured in a manner of being projected from an inner surface of the rear case 232 toward one side. Alternatively, the receiving part 220 can be configured in a manner of projected from an inner surface of the front case 231.

A port part 266 is received in an inner space 221 of the receiving part 220. In this case, the port part 266 is connectible to an external device. According to the present embodiment, the port part 266 includes an external input/output port for example, by which the port part 266 is nonlimited. Alternatively, the port part 266 can include at least one type of a wire/wireless headset port, an external charger port, a wire/wireless data port, a memory card port, a port for connecting a device having an identity module, an audio I/O (input/output) port, a video I/O (input/output) port, an earphone port and the like.

The port part 266 can be loaded on a sub-board 264 and is configured to be connectible to a connector of an external device. According to the present embodiment, the port part 266 is configured in a manner that a connector of an external device is inserted in the port part 266. Access terminals for electric connection to the connector of the external device are provided in the port part 266. The sub-board 264 can be connected to a main board (not shown in the drawing) in the main body unit 230 by a flexible printed circuit board (not shown in the drawing).

A port cover 240 for opening or closing the opening 238 is connected to the case, and more particularly, to the rear case 232. The port cover 240 is rotatably connected to the rear case 232 to open/close the opening 238. Alternatively, unlike the present embodiment, the port cover 240 can be rotatably connected to the front case 231.

An unloading unit 250 is provided between the port part 266 and the port cover 240. The unloading unit 250 enables the port part 266 to be externally unloaded according to an opening action of the port cover 240. The port part 266 can be unloaded from the receiving part 220 according to an action of the unloading unit 250. The port part 266 is unloaded from the receiving part 220 and can be unloaded outside the opening 238.

According to the present embodiment, unlike the former embodiment described with reference to FIGS. 1 to 13, the port assembly 266, 250 includes the port part 266 and the unloading unit 250. In this case, the unloading unit 250 can include a slider 270 and a link member 290.

The slider 270 is configured to receive the port part 266 therein. According to the present embodiment, the slider 270 is configured to have a shape of a box of which one side is open for example. The port part 266 is received in an inner space of the receiving part 220 and is slidably loaded therein.

The link member 290 can be configured to have a shape of a rod. One end portion of the link member 290 is rotatably linked to the slider 270, while the other is rotatably linked to the port cover 240. Optionally, a pair of link members can be provided to both lateral sides of the slider 270, respectively.

First and second connecting holes 292 and 294 for connections to the slider 270 and the port cover 240 can be provided to the end portions of the link member 290, respectively.

The port cover 240 can include a cover body 241 configured to cover the opening 238 and first and second connecting portions 242 and 234 projected from one surface of the cover body 241.

An outer surface of the main body unit 230 can have a rounded curve portion 237 as shown in the present embodiment. In this case, the cover body 241 can have a curved surface to correspond to the curve portion 237. In this case a curvature of the curve portion 237 is equal to that of the cover body 241. Accordingly, in case that the port cover 240 covers the opening 238, the outer surface of the port cover 240 is not projected from the curve portion 237 or is not recessed below the curve portion 237.

The first connecting portion 242 is configured to be connectible to the rear case 232. A support portion 234 is provided to one side of the opening 238, and a connecting projection 235 can be provided to the support portion 234. The first connecting portion 242 is provided with a connecting hole. The connecting projection 235 is rotatably connected to the connecting hole of the first connecting portion 242.

The second connecting portion 243 is provided at a location spaced apart from the first connecting portion 242 in a predetermined distance and is configured to be connectible to the link member 290. The second connecting portion 243 is provided with a connecting projection that is rotatably connected to the second connecting hole 294 of the link member 290.

On the other surface of the cover body 241, a holding piece 244 for user's manipulation can be formed. Therefore, a user is able to turn the cover body 241 by holding the holding piece 244 with finger.

A guide part is provided between the receiving part and the slider 270 to guide a motion of the slider 270. The guide part can include a guide projection 272 provided in a manner of being projected from a lateral side of the slider 270 and a guide slot 222 provided to a sidewall of the receiving part 220. The guide projection 272 is inserted in the guide slot 222. When the slider 270 is moving, the guide projection 272 is sliding on the guide slot 222.

The guide slot 222 is configured to have a shape of a slot perforating the sidewall of the receiving part 220. The guide projection 272 extends up to a predetermined distance while inserted in the guide slot 222. The link member 290 is rotatably linked to the guide projection 272 inserted in the guide slot 222. This can be implemented in a manner that the first connecting hole 292 of the link member 290 is rotatably connected to the guide projection 272.

The guide slot 22 is configured as a straight line that follows a horizontal direction. The straight line type guide slot 222 guides a straight-lined movement of the slider 270 in the horizontal direction. Yet, the guide slot 222 can be variously implemented according to a sliding type of the slider 270. In particular, a motion of the slider 270 depends on the shape of the guide slot 222.

Figure 17A:
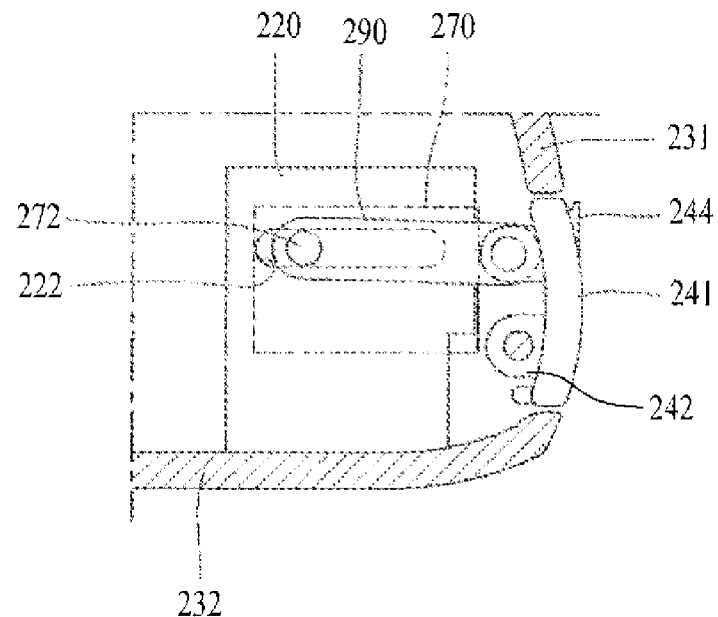
FIGS. 17A to 17C are cross-sectional diagrams of the portable terminal bisected along a line V-V shown in FIG. 15.
Figure 17B:
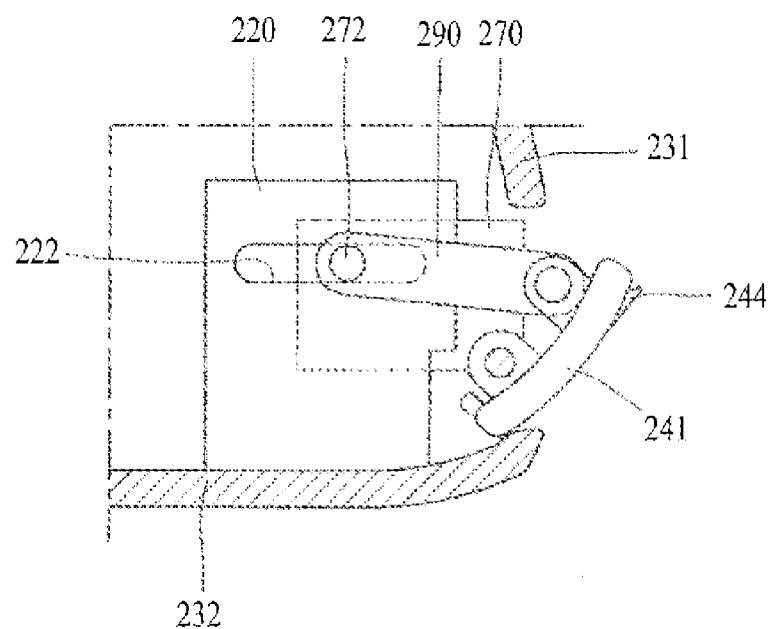
Figure 17C:
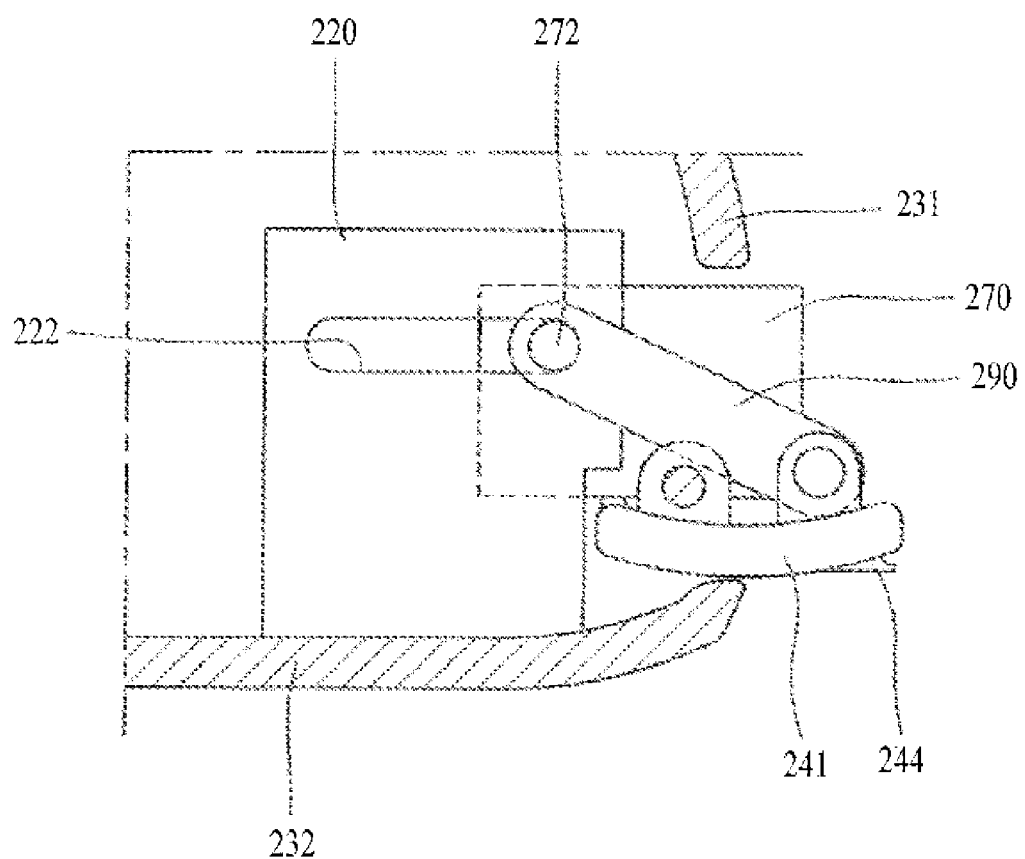

FIGS. 17A to 17C are cross-sectional diagrams of the portable terminal bisected along a line V-V shown in FIG. 15, in which operational states of the unloading unit are sequentially shown.

FIG. 17A shows the cover body 241 that is blocking or covering the opening 238. In this case, the slider is received in the inner space (cf. '221' in FIG. 16) of the receiving part 220.

Referring to FIG. 17B, while the holding piece 244 is held with a finger, if a rotational force is applied to the cover body 241 clockwise in the present drawing, the cover body 241 is turned centering on the first connecting portion 242.

The link member 290 performs translational motion and rotational motion according to the rotation of the cover body 241. The guide projection 272 connected to the link member 290 moves straight on the guide slot 222 while the link member 290 rotates centering on the guide projection 272 clockwise in the present drawing.

As the guide projection 272 moves straight, the slider 270 and the port part 266 inside the slider 270 moves straight in the inner space 221 of the receiving part 220.

Referring to FIG. 17C, once the guide projection 272 moves to the end portion of the guide slot 222, the movement of the guide projection 272 is restricted, whereby the movements of the link member 290, the slider 270, the port part 266 and the like are completed. By this action, the slider 270 is unloaded from the receiving part 220. And, the end portion of the port part 266 is exposed to an outside of the opening (cf. '238' in FIG. 16).

Thus, the present invention is configured to unload the port part 266 from an inside of the case in an outer direction in a manner of opening the opening 238 by turning the port cover 240, thereby facilitating a user to connect a connector of an external device to the port part 266.

The configuration of the present invention is more useful when the lateral side of the case, as shown in FIG. 16, has the rounded curve portion 237. In case of attempting to provide the curve portion 237 to the lateral side of the main body unit 230 by maintaining a slim thickness of the main body unit 230, a loaded location of the port part 266 is preferably set to be recessed from the outer surface of the case with a predetermined gap in consideration of a size of the port part 266.

In this case, the port part 266 becomes spaced apart far from the opening 238 of the case. If a user attempts to connect a connector of an external device to the port part 266, a user may have considerable inconvenience. According to the present invention, the port part 266 located inward with the predetermined gap from the opening can be unloaded externally, whereby the inconvenience can be settled.

A closing motion of the port cover 240 is performed in order reverse to that of the aforesaid action. In particular, once the cover body 241 is turned counterclockwise, the link member 290 performs the translation and rotational motions to enable the slider 270 to return to the original position.

Figure 18A:
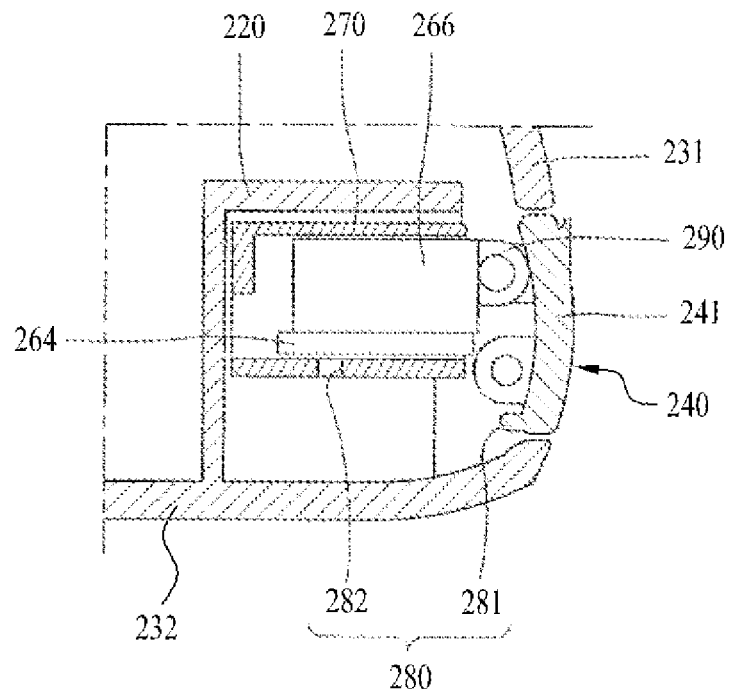
FIG. 18A and FIG. 18B are cross-sectional diagrams of the portable terminal bisected along a line VI-VI shown in FIG. 15.
Figure 18B:
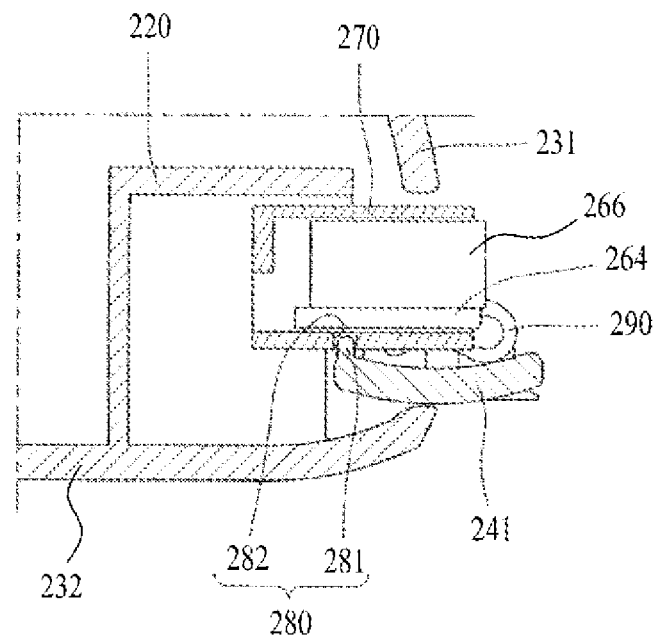

FIG. 18A and FIG. 18B are cross-sectional diagrams of the portable terminal bisected along a line VI-VI shown in FIG. 15.

FIG. 18A shows a state that the opening is blocked by the port cover. And, FIG. 18B shows a state that the port cover is turned to open the opening.

Referring to FIG. 18A and FIG. 18B, a locating part 280 is provided between the port cover 240 and the slider 270 to fix the position of the slider 270 when the port part 266 is unloaded.

The locking part 280 can include a locking projection 281 provided to the port cover 240 and a locking recess 282 provided to the slider 270.

The locking projection 281 can be provided to an end portion of the cover body 241, while the locking recess 282 is provided to a backside of the slider 270. When an opening action of the port cover 240 is performed, the locking projection 281 is locked by the locking recess 282 to be fixed thereto. For this, the locking projection 281 and the locking recess 282 are provided to locations that oppose each other in case of completion of the unloading of the slider 270.

The above-described configuration can prevent the port part 266 from returning toward the receiving part 220 by being pushed by a connector in the course of connecting the connector of an external device to the port part 266.

While the locking projection 281 is locked by the locking recess 282, if the cover body 241 is turned in a closing direction, the locking projection 281 is disengaged from the locking recess 282 to release the locking of the slider 270. Therefore, the slider 270 is enabled to return.

Figure 19:
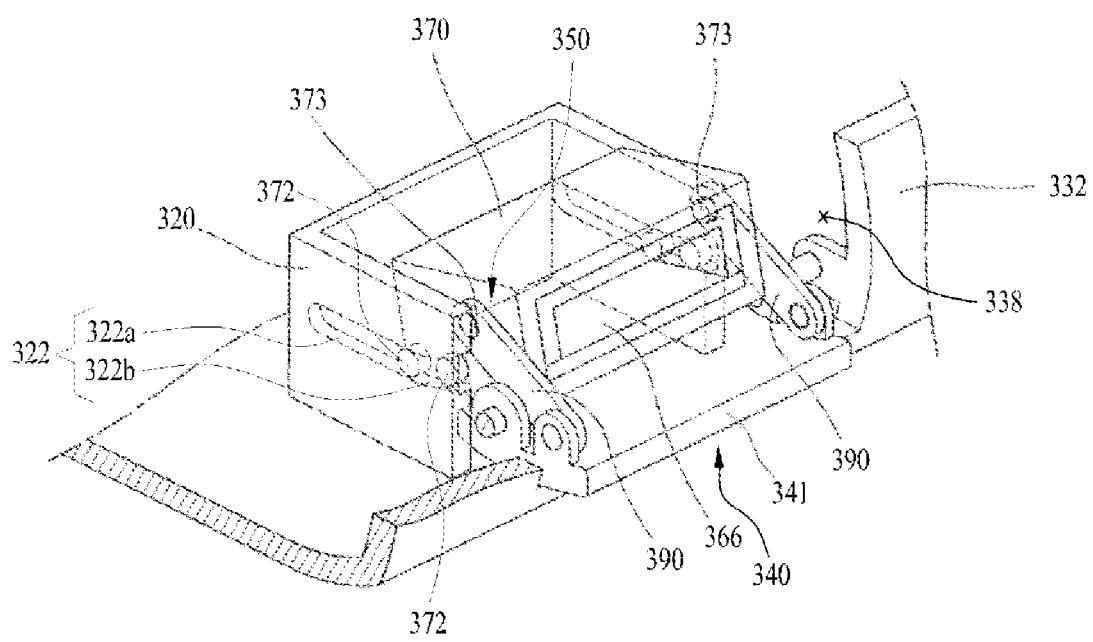
FIG. 19 is a perspective diagram of an unloading unit according to another embodiment of the present invention.
Figure 20A:
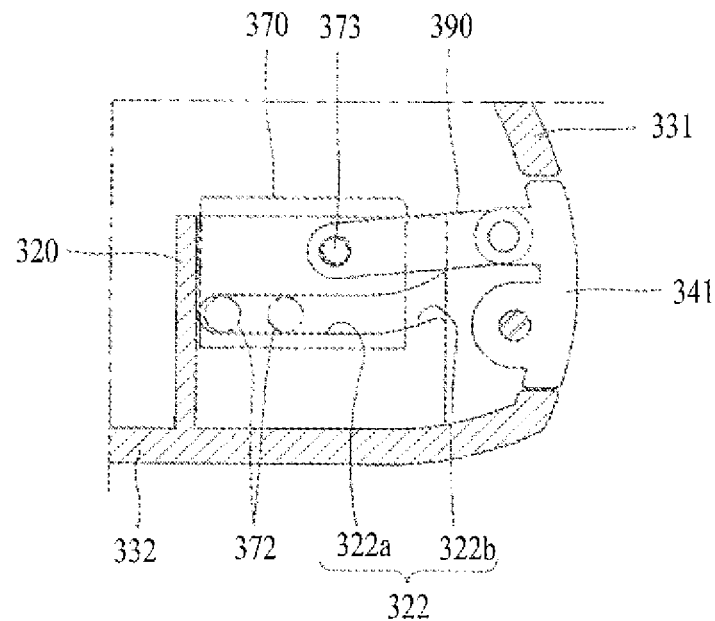
FIG. 20A and FIG. 20B are cross-sectional diagrams of the unloading unit shown in FIG. 19, in which operational states of the unloading unit are shown.
Figure 20B:
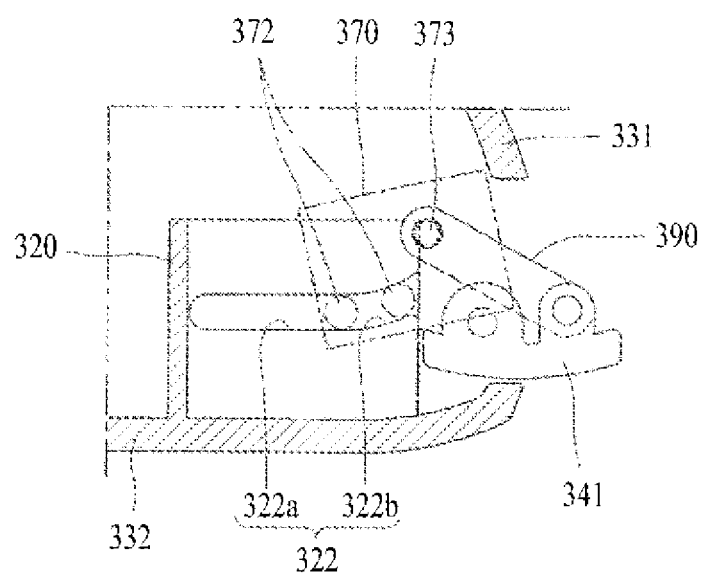

FIG. 19 is a perspective diagram of an unloading unit according to another embodiment of the present invention. And, FIG. 20A and FIG. 20B are cross-sectional diagrams of the unloading unit shown in FIG. 19, in which operational states of the unloading unit are laterally shown.

As mentioned in the above mentioned description of the former embodiment, a rear case 332 includes a receiving part 320 for receiving a port part 366 therein. And, a port cover 340 for opening or closing an opening 338 is rotatably connected to the rear case 332.

Moreover, an unloading unit 350 is provided between the port part 366 and the port cover 340 to unload the port part 366 from the receiving part 320 according to an opening action of the port cover 340. The unloading unit 350 according to the present embodiment is configured to unload the port part 366 by tilting it at a predetermined angle.

The receiving part 320 is configured to have an open topside to enable the port part 366 to be tilted.

Like the former embodiment, the unloading unit 350 includes a slider 370 and a link member 390. The link member 390 is rotatably linked to the connecting projection 373 projected from a lateral side of the slider 370.

A guide part for guiding a straight motion and a tilting motion of the slider 370 is provided between the receiving part 320 and the slider 370. The guide part includes a guide projection 372 projected from a lateral side of the slider 370 and a guide slot 322 configured to be movable by having the guide projection 372 inserted therein.

According to the former embodiment, the link member 390 is directly linked to the guide projection 272. Yet, according to the present embodiment, the link member 390 is linked to the connecting projection 373. A plurality of guide projections 372 can be provided to both lateral sides of the slider 370. In particular, according to the present embodiment, two guide projections 372 are provided to each of the lateral sides of the slider 370. The number of the guide projections 372 is non-limited by the present invention. Alternatively, one guide projection 372 can be provided to each of the lateral sides of the slider 370.

The guide slot 322 can include a straight line portion 322*a* configured to implement a straight motion section and a curved portion 322*b* configured to have bent shape at an end portion of the straight line portion 322*a* to implement a tilting section of the slider 370. The straight line portion 322*a* is configured to have a shape of a straight line that follows a horizontal direction. The curved portion 322*b* is configured to be bent to correspond to a tilting angle of the slider 370.

According to the present embodiment, like the former embodiment of the present invention, the link member 390 performs the translational motion and the rotational motion according to a rotation of the cover body 341. Accordingly, the slider 370 linked to the link member 390 moves within the receiving part 320.

Referring to FIG. 20A, while the guide projection 372 is passing through the straight line portion 322*a*, the slider 370 performs the straight movement. Referring to FIG. 20B, when the guide projection 372 passes through the curved portion 322*b*, the slider 370 is tilted at a predetermined angle to tilt the port part 366. The locking part 280 of the former embodiment is identically applicable to the present embodiment. Therefore, while the port part 366 is unloaded, it is able to fix a position of the slider 370.

According to the present embodiment, a direction oriented by the port part 366 is upright while the port part 366 is unloaded. Therefore, a user is facilitated to connect a connector of an external device to the port part 366 more conveniently.

The rest of configurations of the present embodiment except the above mentioned configurations are identical to those of the former embodiment, of which descriptions are omitted by referring to the description of the former embodiment.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A portable terminal, comprising:
 a main body unit having an opening at a side thereof;
 a port cover rotatably formed on the side of the main body unit to open or close the opening; and
 a port assembly formed within the main body,
 wherein the port assembly comprises:
  a port unit having a port part to be connected to an external device by being projected out of the opening when the port cover opens the opening, and
  a driving unit connected to the port unit to provide a driving force for sliding the port unit when the port cover opens the opening
  wherein the port unit comprises a sub-board having an electric circuit and the port part mounted thereon, the sub-board electrically connected to a main board via a flexible cable; and a slider having the sub-board mounted thereon and a driving projection therein.

2. The portable terminal of claim 1, wherein
 the side of the main body unit is sloped, and
 the port cover is configured to be part of the main body unit when the port cover closes the opening.

3. The portable terminal of claim 1 wherein the port assembly is configured to slide in a horizontal direction of the main body unit when the port cover rotatably opens or closes.

4. The portable terminal of claim 1, wherein the driving unit is configured to provide the driving force to the port unit in a direction opposite to a push direction when a push action in the push direction is performed on the port cover to unlatch the driving unit.

5. The portable terminal of claim 1, wherein the driving unit has a push-latch configuration such that:
 the driving unit provides an elastic force to the port unit in a direction opposite to a push direction when the port cover is pushed in the push direction thereby unlatching the driving unit, and
 the driving unit does not provide the elastic force to the port unit when the port cover is pushed again to overcome the elastic force thereby latching the driving unit.

6. The portable terminal of claim 1, wherein the port cover includes a guide slit configured in a circular arc shape to guide a driving projection of the port unit thereby converting a rotary motion of the port cover into the sliding of the port unit.

7. The portable terminal of claim 1, wherein the port cover includes a hinge part to be hinged on the main body unit.

8. A portable terminal, comprising:
 a main body unit having an opening at a side thereof;
 a port cover rotatably formed on the side of the main body unit to open or close the opening; and
 a port assembly formed within the main body unit
 wherein the port assembly comprises:
  a port unit having a port part to be connected to an external device by being projected out of the opening when the port cover opens the opening;
  a driving unit connected to the port unit to provide a driving force for sliding the port unit when the port cover opens the opening; and
  a slide holder provided to both sides of the port unit to guide a horizontal movement of the port unit and support the port unit.

9. The portable terminal of claim 1, further comprising a spring inserted between the port cover and the main body unit to provide an elastic force to enable the port cover to rotatably open the opening.

10. The portable terminal of claim 1, wherein
 the port assembly includes a rack gear having a plurality of saw teeth formed, and
 the port cover includes a pinion gear configured to rotate by engaging with the rack gear.

11. The portable terminal of claim 10, wherein the pinion gear is a rotational shaft of a hinge part of the port cover.

12. A portable terminal, comprising:
 a main body unit having an opening at a side thereof;
 a port cover rotatably formed on the side of the main body unit to open or close the opening; and
 a port assembly formed within the main body unit wherein the port assembly comprises:
a port unit having a port part to be connected to an external device by being projected out of the opening when the port cover opens the opening;
a driving unit connected to the port unit to provide a driving force for sliding the port unit when the port cover opens the opening;
a receiving part fixed to the main body unit; and
a slider fixed to the port part wherein the slider is configured to slide into the receiving part;
wherein the driving unit comprises a link member having a first end linked to the slider and a second end linked to the port cover.

13. The portable terminal of claim 12, further comprising a guide part configured to guide a motion of the slider, the guide part comprising:
   a guide projection projecting from the slider; and
   a guide slot formed on a sidewall of the receiving part to enable the guide projection to be movably inserted therein.

14. The portable terminal of claim 13, wherein the guide slot is configured to guide the slider in a linear motion.

15. The portable terminal of claim 13, the guide slot comprising:
   a linear portion configured to guide the slider in a linear motion; and
   a curved portion at an end portion of the linear portion.

* * * * *